United States Patent
Ohkoshi et al.

(10) Patent No.: US 7,691,451 B2
(45) Date of Patent: Apr. 6, 2010

(54) COMPOSITE POWDER COATING MATERIAL, PROCESS FOR PRODUCTION THEREOF AND METHOD FOR THE COLOR MATCHING OF POWDER COATING MATERIAL

(75) Inventors: Toshio Ohkoshi, Tokyo (JP); Manabu Imose, Osaka (JP)

(73) Assignee: Kansai Paint Co., Ltd., Amagasaki-Shi (JP)

( * ) Notice: Subject to any disclaimer, the term of this patent is extended or adjusted under 35 U.S.C. 154(b) by 287 days.

(21) Appl. No.: 11/666,876

(22) PCT Filed: Nov. 22, 2005

(86) PCT No.: PCT/JP2005/021444

§ 371 (c)(1),
(2), (4) Date: May 2, 2007

(87) PCT Pub. No.: WO2006/057241

PCT Pub. Date: Jun. 1, 2006

(65) Prior Publication Data

US 2007/0299196 A1    Dec. 27, 2007

(30) Foreign Application Priority Data

Nov. 25, 2004    (JP)    ............... 2004-340117

(51) Int. Cl.
*B05D 1/40*    (2006.01)
(52) U.S. Cl. ............. 427/486; 525/100; 525/403; 525/418; 525/474; 528/501; 524/904; 428/457; 428/458
(58) Field of Classification Search ............. 525/444, 525/55, 100, 107, 165, 403, 404, 408, 418, 525/419, 437, 438, 445, 446, 449, 474, 476, 525/479; 523/330, 332, 340; 528/501; 524/904; 428/457, 458; 427/486
See application file for complete search history.

(56) References Cited

U.S. PATENT DOCUMENTS

| | | | | |
|---|---|---|---|---|
| 4,115,637 | A * | 9/1978 | Cenci et al. | ............... 525/328.2 |
| 5,319,001 | A * | 6/1994 | Morgan et al. | ............... 523/205 |
| 6,162,861 | A | 12/2000 | Kawamoto et al. | |
| 6,331,581 | B1 * | 12/2001 | Ohnishi et al. | ............... 523/221 |

FOREIGN PATENT DOCUMENTS

| | | |
|---|---|---|
| EP | 0 459 048 | 12/1991 |
| EP | 0 982 380 | 3/2000 |
| EP | 1 279 706 | 1/2003 |
| JP | 4-504431 | 8/1992 |
| JP | 7-188586 | 7/1995 |
| JP | 11-241039 | 9/1999 |
| JP | 2000-239579 | 9/2000 |
| WO | WO 90/06345 | 6/1990 |
| WO | 98/51748 | 11/1998 |

OTHER PUBLICATIONS

Missouri University of Science and Technology, Index to the Notes for Chem 381—Polymer and Coatings Science: Physical Properties of Polymers, Jul. 8, 1995 [onilne], accessed via the Internet [retrieved on Mar. 31, 2009], URL:<http://web.mst.edu/~wlf/chem381/chap11.html#mp>.*

Cheminfo, MSDS for Diglycidyl ether of bisphenol A-based epoxy resins, medium to high molecular weight solids, Jun. 21, 2004 [online], accessed via the Internet [retrieved on Mar. 31, 2009], URL:<http://www.intox.org/databank/documents/chemical/epoxyres/cie773.htm >.*

German Office Action and English translation dated Feb. 1, 2008.

* cited by examiner

*Primary Examiner*—David Wu
*Assistant Examiner*—Robert Jones, Jr.
(74) *Attorney, Agent, or Firm*—Kratz, Quintos & Hanson, LLP

(57) ABSTRACT

The present invention provides a composite powder coating composition obtained by granulating, with a liquid binder, a plurality of starting powder coating materials that are different from each other in hue and/or kind of base resin, and drying the granules, the liquid binder being a solution or dispersion of a binder compound having a softening temperature of 30 to 200° C. and containing a self-crosslinkable functional group or groups and/or a functional group or groups that complementarily react with functional groups of the starting powder coating materials, in a solvent that does not dissolve the starting powder coating materials; production process therefor; and a method for color-matching a composite powder coating composition, the method comprising the steps of dry blending, for color matching, a plurality of starting powder coating materials having different hues, granulating the resulting blend by adding the above-mentioned liquid binder, and drying the granules.

23 Claims, No Drawings

COMPOSITE POWDER COATING MATERIAL, PROCESS FOR PRODUCTION THEREOF AND METHOD FOR THE COLOR MATCHING OF POWDER COATING MATERIAL

TECHNICAL FIELD

The present invention relates to a composite powder coating composition, production process therefor, and method for color matching a powder coating composition.

BACKGROUND ART

Color matching of powder coating compositions has been carried out, for example, by the following method to realize the color specified by the user: coloring pigments, powder resin, curing agent, etc. are dry blended, and the obtained blend is mixed and melted using a twin-screw dispersing device or the like, followed by cooling, coarse grinding, fine grinding, and sieving to produce contemplated color-matched powder coating compositions.

The above-mentioned production of color-matched powder coating compositions poses no problem in producing a large amount of powder coating composition with a specified color, but when powder coating compositions of various colors are produced in small amounts, i.e., in the case of small-lot production of powder coating compositions with different colors, many problems are encountered, including a great loss of powder coating compositions, considerable labor, increased contamination, and so on.

In order to solve such problems, WO 90/06345 discloses a method for color matching a powder coating composition, in which a mixture of two or more kinds of powder coating materials with different colors is granulated using an aqueous acrylic resin as a granulating agent, to obtain a color-matched powder coating composition. Further, Japanese Unexamined Patent Application Publication No. 1995-188586 discloses a color matching method in which two or more kinds of powder coating materials are dry blended for color matching, and the blend is granulated using a synthetic resin as a binder. However, these known methods requires the use of an aqueous acrylic resin and a binder resin both having a high molecular weight to prevent the degradation of film properties, causing problems such as a decrease in film properties such as film smoothness, film appearance, etc. due to the low thermal flowability of the granulated powder coating composition; irregular granules due to high viscosity of the resin components; etc.

Furthermore, Japanese Unexamined Patent Application Publication No. 1999-241039 discloses a color-matched thermosetting powder coating composition obtained by wet-mixing a coloring liquid with an initial-color thermosetting powder coating material. However, since the color-matched powder coating composition is produced by mixing the coloring liquid with one kind of powder coating material, the hue of the resulting powder coating composition greatly depends on the hue of the coloring liquid. Therefore, to obtain a powder coating composition having a greatly different hue from that of the initial-color powder coating material, the coloring liquid needs to be used in a large amount. This may reduce the blocking resistance of the resulting powder coating composition, thereby deteriorating film properties such as film appearance, weather resistance, water resistance, etc.

DISCLOSURE OF THE INVENTION

Problems to be Solved by the Invention

An object of the present invention is to provide a composite powder coating composition that is free from flooding, is excellent in film properties such as film appearance, film smoothness, water resistance, weather resistance, adhesion, etc., and can be easily color-matched or produced in small lots of different colors.

Another object of the present invention is to provide a production process for the above composite powder coating composition.

Another object of the present invention is to provide a film formation method using the above composite powder coating composition, and an article coated with the composite powder coating composition.

Yet another objects of the present invention is to provide a method for color matching a powder coating composition.

Further objects and the characteristics of the present invention will become clear from the following description.

Means for Solving the Problems

As a result of extensive research, the present inventors found that the above objects can be achieved by a composite powder coating composition in which a plurality of powder coating materials are bound with a specific liquid binder. The present invention was accomplished by further research based on such a finding.

The present invention provides the following composite powder coating compositions, production processes therefor, coating film formation methods using the same; articles coated therewith; and methods for color matching powder coating compositions.

1. A composite powder coating composition obtained by granulating, with a liquid binder, a plurality of starting powder coating materials that are different from each other in hue and/or kind of base resin, and drying the granules; the liquid binder being a solution or dispersion of a binder compound having a softening temperature of 30 to 200° C. and containing a self-crosslinkable functional group or groups and/or a functional group or groups that complementarily react with functional groups of the starting powder coating materials, in a solvent that does not dissolve the starting powder coating materials.

2. A composite powder coating composition according to item 1, wherein the proportion of the liquid binder is 0.1 to 20 parts by weight, on a solid basis, per 100 parts by weight of the starting powder coating materials.

3. A composite powder coating composition according to item 1, wherein the starting powder coating materials have a mean particle diameter of not more than 50 μm.

4. A composite powder coating composition according to item 3, wherein the starting powder coating materials have a mean particle diameter of 1 to 40 μm.

5. A composite powder coating composition according to item 1, wherein the base resin of each starting powder coating material is at least one thermoplastic resin or thermosetting resin selected from the group consisting of polyester resins, vinyl resins, epoxy resins, fluororesins, and silicon resins.

6. A composite powder coating composition according to item 1, wherein at least one of the plurality of starting powder coating materials is a thermosetting colored powder coating material.

7. A composite powder coating composition according to item 1, wherein the starting powder coating materials have at least one hue selected from the group consisting of white, black, gray, blue, green, red, and yellow.

8. A composite powder coating composition according to item 1, wherein the solvent of the liquid binder comprises water and/or a hydrophilic solvent as a main component.

9. A composite powder coating composition according to item 8, wherein the hydrophilic solvent has a boiling point that is lower than the softening temperatures of the starting powder coating materials.

10. A composite powder coating composition according to item 1, wherein the liquid binder has a binder compound solids content of 1 to 50 wt. %.

11. A composite powder coating composition according to item 1, wherein the binder compound having a self-crosslinkable functional group or groups is a thermosetting resin.

12. A composite powder coating composition according to item 11, wherein the thermosetting resin is at least one resin selected from the group consisting of shellac resins, amino-curable resins, and epoxy-curable resins.

13. A composite powder coating composition according to item 1, wherein the binder compound having a functional group or groups that complementarily react with functional groups of the starting powder coating materials is at least one compound selected from the group consisting of β-hydroxyalkylamides, polycarboxylic acids, polyols, and oxazolines.

14. A method for forming a coating film, the method comprising applying to a metal substrate a composite powder coating composition according to item 1 by electrostatic powder coating, and heating the applied composition to form a cured coating film.

15. A coated article comprising a metal substrate and a coating film formed on the substrate by a method according to item 14.

16. A process for producing a composite powder coating composition, the process comprising the steps of:

(1) dry blending a plurality of starting powder coating materials that are different from each other in hue and/or kind of base resin;

(2) granulating the resulting blend by adding a liquid binder obtained by dissolving or dispersing, in a solvent that does not dissolve the starting powder coating materials, a binder compound having a softening temperature of 30 to 200° C. and containing a self-crosslinkable functional group or groups and/or a functional group or groups that complementarily react with functional groups of the starting powder coating materials; and (3) drying the granules.

17. A method for color matching a composite powder coating composition, the method comprising the steps of:

(1) dry blending a plurality of starting colored powder coating materials having different hues, for color matching;

(2) granulating the resulting blend by adding a liquid binder obtained by dissolving or dispersing, in a solvent that does not dissolve the starting powder coating materials, a binder compound having a softening temperature of 30 to 200° C. and containing a self-crosslinkable functional group or groups and/or a functional group or groups that complementarily react with functional groups of the starting powder coating materials; and (3) drying the granules.

18. A color matching method according to item 17, wherein the proportion of the liquid binder is 0.1 to 20 parts by weight, on a solid basis, per 100 parts by weight of the starting colored powder coating materials.

19. A color matching method according to item 17, wherein the starting colored powder coating materials have a mean particle diameter of not more than 50 μm.

20. A color matching method according to item 19, wherein the starting colored powder coating materials have a mean particle diameter of 1 to 40 μm.

21. A color matching method according to item 17, wherein the base resin of each starting colored powder coating material is at least one thermoplastic resin or thermosetting resin selected from the group consisting of polyester resins, vinyl resins, epoxy resins, fluororesins, and silicon resins.

22. A color matching method according to item 17, wherein at least one of the plurality of starting colored powder coating materials is a thermosetting colored powder coating material.

23. A color matching method according to item 17, wherein the starting colored powder coating materials have at least one hue selected from the group consisting of white, black, gray, blue, green, red, and yellow.

24. A color matching method according to item 17, wherein the solvent of the liquid binder comprises water and/or a hydrophilic solvent as a main component.

25. A color matching method according to item 24, wherein the hydrophilic solvent has a boiling point that is lower than the softening temperatures of the starting colored powder coating materials.

26. A color matching method according to item 17, wherein the liquid binder has a solids content of 1 to 50 wt. %.

27. A color matching method according to item 17, wherein the compound having a self-crosslinkable functional group or groups is a thermosetting resin.

28. A color matching method according to item 27, wherein the thermosetting resin is at least one resin selected from the group consisting of shellac resins, amino-curable resins, and epoxy-curable resins.

29. A color matching method according to item 17, wherein the compound having a functional group or groups that complementarily react with functional groups of the starting colored powder coating materials is at least one compound selected from the group consisting of β-hydroxyalkylamides, polycarboxylic acids, and polyols.

As used herein, the softening temperature is measured by the following method based on ASTM E28-67. Using an "elevated flow tester" (product of Shimadzu Corp.), a load of 20 kg/cm$^2$ is applied to a 1 cm$^3$ sample with a plunger while heating the sample at a temperature rise rate of 6° C./min, and a nozzle with a diameter of 1 mm and a length of 1 mm is extruded. When the height of a S-curve showing the relationship between the amount of descent of the plunger (flow amount) and the temperature is defined as h, the temperature corresponding to h/2 is the softening temperature (° C.).

As used herein, the weight average molecular weight is measured by gel permeation chromatography (GPC) based on polystyrene standards.

Composite Powder Coating Composition

The composite powder coating composition of the present invention is obtained by granulating, with a liquid binder, a plurality of starting powder coating materials that are different from each other in hue and/or kind of base resin, followed by drying. The liquid binder is a solution or dispersion of a binder compound having a softening temperature of 30 to 200° C. and containing a self-crosslinkable functional group or groups and/or a functional group or groups that complementarily react with functional groups of the starting powder coating materials, in a solvent that does not dissolve the starting powder coating materials.

The liquid binder binding particles of the starting powder coating materials is cured by the self-crosslinkable groups, or by the chemical bond formed by the reaction of the functional groups that complementarily react with functional groups of the starting powder coating materials. Thus, the powder coating composition of the present invention is capable of forming a coating film that is excellent in water resistance, weather resistance, etc. Further, the use of the liquid binder makes it possible to disperse and mix the starting powder coating materials more homogeneously, and to bind and granulate the coating materials more securely, than in the case of using a solid binder. The solvent used dissolves or disperses the binder compound but does not dissolve the starting powder coating materials, and thus does not deform or deteriorate the starting powder coating material particles. Furthermore, since the binder compound has a softening temperature of 30 to 200° C., when the composite powder coating composition of the present invention is applied and melted by heating, the portion derived from the starting powder coating materials and the portion derived from the binder compound are melted simultaneously, making it possible to form a homogeneous coating film.

Starting Powder Coating Materials

The following are examples of combinations of the plurality of starting powder coating materials used in the present invention.

(1) Two or more starting powder coating materials having different hues but comprising the same kind of base resin.

(2) Two or more starting powder coating materials having different hues and comprising different kinds of base resins.

(3) Two or more starting powder coating materials having the same hue but comprising different kinds of base resins.

The proportion of the plurality of starting powder coating materials is not limited, and two or more starting powder coating materials can be used in an arbitrary proportion so that the resulting composite powder coating composition has a desired hue.

The hues of the starting powder coating materials mean the hues of the surfaces of continuous coating films formed from the powder coating materials. Examples of hues of starting powder coating materials include white, black, gray, blue, green, red, yellow, etc. The starting powder coating materials may have such transparent colored hues as to form coating films that are colored to such a degree that the underlying surface is not completely hidden.

Various hues can be obtained by arbitrarily combining the hues of the starting powder coating materials. Examples of such combinations include combinations of achromatic hues such as white and gray, combinations of chromatic hues such as blue and green, combinations of an achromatic hue and chromatic hue such as gray and blue, etc. Even when the starting powder coating materials have similar hues, they can be used as starting powder coating materials having different hues as long as the difference in hue can be visually recognized.

When two powder coating materials having different hues are used, the maximum color difference ($\Delta E^*ab$) between particles of a powder coating material and those of the other powder coating material is preferably at least 0.5, and more preferably at least 1, as expressed as the color difference according to JIS K5600-4-6, regardless of whether the hues of the powder coating materials are chromatic or achromatic.

The color difference is calculated according to the following formula.

$$\Delta E^*ab=[(\Delta L^*)^2+(\Delta a^*)^2+(\Delta b^*)^2]^{1/2}$$

wherein $\Delta L^*=\Delta L^*_T-\Delta L^*_R$; $\Delta a^*=\Delta a^*_T-\Delta a^*_R$; and $\Delta b^*=\Delta b^*_T-\Delta b^*_R$.

The components of the starting powder coating materials include base resins, curing agents, coloring pigments, fillers, additives, etc. Among such components, curing agents are usually used when the powder coating materials are thermosetting coating materials.

Examples of base resins of the starting powder coating materials include thermoplastic resins and thermosetting resins, such as polyester resins, vinyl resins, epoxy resins, fluororesins, silicon resins, etc. Vinyl resins include acrylic resins. The use of such resins improves film appearance and like film properties.

The above base resins are solid at room temperature, and preferably have a softening temperature of about 40 to about 200° C. The curing agents may be solid or liquid, and are preferably solid.

Usable combinations of base resins of starting powder coating materials include, for example, combinations of blocked polyisocyanate-curable polyester resins and blocked polyisocyanate-curable acrylic resins; combinations of blocked polyisocyanate-curable polyester resins and β-hydroxyalkylamide-curable polyester resins; etc.

Particularly preferable as the starting powder coating materials are thermosetting colored powder coating materials comprising thermosetting resins, curing agents, and coloring pigments. When at least one of the starting powder coating materials is a thermosetting colored powder coating material, film properties such as water resistance, weather resistance, adhesion, etc. are improved.

When a thermosetting coating material is used as a starting powder coating material, examples of combinations of thermosetting resins and curing agents are as follows.

(1) Combinations of hydroxy-containing thermosetting resins and curing agents having functional groups that undergo a curing reaction with the hydroxy groups when heated Usable hydroxy-containing resins include, for example, known resins for powder coating materials, such as hydroxy-containing acrylic resins, hydroxy-containing polyester resins, etc. Curing agents that can be used in combination with such hydroxy-containing resins include, for example, known curing agents for powder coating materials, such as blocked polyisocyanate compounds, aminoplast resins, etc.

(2) Combinations of carboxy-containing thermosetting resins and curing agents having functional groups that undergo a curing reaction with the carboxy groups when heated Usable carboxy-containing resins include, for example, known resins for powder coating materials, such as carboxy-containing acrylic resins, carboxy-containing polyester resins, etc. Examples of curing agents that can be used in combination with such carboxy-containing resins include known curing agents for powder coating materials, such as bisphenol A-epichlorohydrin-type epoxy resins, alicyclic epoxy resins, novolac-type epoxy resins, epoxy-containing acrylic resins, and other epoxy resins; β-hydroxyalkylamide compounds; etc.

(3) Combinations of epoxy-containing thermosetting resins and curing agents having functional groups that undergo a curing reaction with the epoxy groups when heated Usable epoxy-containing resins include, for example, known resins for powder coating materials, such as bisphenol A-epichlorohydrin-type epoxy resins, alicyclic epoxy resins, novolac-type epoxy resins, epoxy-containing acrylic resins, etc. Examples of curing agents that can be used in combination with such epoxy-containing resins include known curing agents for powder coating materials, such as carboxy-containing polyester resins, organic acids, polyhydrazide compounds, imidazole compounds, dicyandiamide compounds, polycarboxylic acid compounds, acid anhydrides, etc.

Among the above combinations, the following combinations are preferable since they can achieve excellent film properties such as weather resistance, film smoothness, film appearance, etc.

(i) Combinations of Hydroxy-Containing Polyester Resins and Blocked Polyisocyanate Compounds The hydroxy-containing polyester resins preferably have a hydroxy value of about 20 to about 200 KOH mg/g, a softening temperature of about 50 to about 150° C., and a weight average molecular weight of about 1,000 to about 10,000. The hydroxy value is more preferably about 25 to about 80 KOH mg/g; the softening temperature is more preferably about 70 to about 140° C.; and the weight average molecular weight is more preferably about 2,000 to about 5,000.

Specific examples of such hydroxy-containing polyester resins include resins obtained by reacting aromatic or alicyclic dicarboxylic acids with dihydric alcohols, optionally together with monocarboxylic acids, tricarboxylic or higher polycarboxylic acids, and/or trihydric or higher polyhydric alcohols, so as to obtain a hydroxy value within the above range.

Examples of aromatic and alicyclic dicarboxylic acids include phthalic acid, phthalic anhydride, isophthalic acid, terephthalic acid, dimethyl isophthalate, dimethyl terephthalate, hexahydrophthalic acid, tetrahydrophthalic acid, hexahydrophthalic anhydride, tetrahydrophthalic anhydride, etc. Examples of dihydric alcohols include ethylene glycol, propylene glycol, polyethylene glycol, polypropylene glycol, butylene glycol, neopentyl glycol, 1,6-hexanediol, dimethylolpropionic acid, etc. Examples of monocarboxylic acids include benzoic acid and the like. Examples of tricarboxylic and higher polycarboxylic acids include trimellitic acid, trimellitic anhydride, etc. Examples of trihydric and higher polyhydric alcohols include trimethylolethane, trimethylolpropane, glycerol, pentaerythritol, etc.

Usable blocked polyisocyanate compounds include, for example, those obtained by blocking isocyanate groups of aliphatic or alicyclic polyisocyanate compounds such as trimethylene diisocyanate, isophorone diisocyanate, hydrogenated xylylene diisocyanate, etc., with blocking agents such as phenols, lactams, alcohols, oximes, etc. In particular, those obtained by blocking isophorone diisocyanate with lactams, such as ε-caprolactam and the like, as blocking agent, so that no free isocyanate groups remain.

(ii) Combinations of Carboxy-Containing Polyester Resins and β-Hydroxyalkylamide Compounds The carboxy-containing polyester resins preferably have an acid value of about 20 to 200 KOH mg/g, a softening temperature of about 50 to about 150° C., and a weight average molecular weight of about 1,000 to about 10,000. The acid value is more preferably about 25 to about 150 KOH mg/g; the softening temperature is more preferably about 70 to about 140° C.; and the weight average molecular weight is more preferably about 2,000 to about 5,000.

Specific examples of such carboxy-containing polyester resins include resins obtained by reacting aromatic or alicyclic dicarboxylic acids with dihydric alcohols, optionally together with monocarboxylic acids, tricarboxylic or higher polycarboxylic acids, and/or trihydric or higher polyhydric alcohols, so as to obtain an acid value within the above range. Usable aromatic or alicyclic dicarboxylic acids, dihydric alcohols, monocarboxylic acids, tricarboxylic or higher polycarboxylic acids, and trihydric or higher polyhydric alcohols include those mentioned above.

(iii) Combinations of Carboxy-Containing Polyester Resins and Epoxy Resins

The carboxy-containing polyester resins may be those mentioned in (ii) above. The epoxy resins preferably have an epoxy equivalent of about 200 to about 3,000, and a softening temperature of about 20 to about 200° C. The epoxy equivalent is more preferably about 300 to about 2,000, and the softening temperature is more preferably about 30 to about 150° C.

Specific examples of such epoxy resins include bisphenol A-type epoxy resins, bisphenol F-type epoxy resins, bisphenol B-type epoxy resins, acrylic epoxy resins, brominated epoxy resins, cyclic aliphatic epoxy resins, etc. Usable cyclic aliphatic epoxy resins include, for example, epoxy resins having epoxy groups such as cyclohexene oxide groups, tricyclodecene oxide groups, cyclopentene oxide groups, etc.

Among the above epoxy resins, from the viewpoint of excellent curability, bisphenol A-epichlorohydrin-type epoxy resins are preferable. Commercial products of such epoxy resins include, for example, "AER-6014" (tradename of Asahi Chemical Chemicals, Inc.); "Epikote 1004" and "Epikote 1007" (tradenames of Japan Epoxy Resin Co., Ltd.); "DER-664" and "DER-667" (tradenames of Dow Chemical Co.); etc.

(iv) Combinations of Epoxy-Containing Acrylic Resins and Polycarboxylic Acid Compounds The epoxy-containing acrylic resins preferably have an epoxy equivalent of about 200 to about 3,000, and a softening temperature of about 20 to about 200° C. The epoxy equivalent is more preferably about 300 to about 2,000, and the softening temperature is more preferably about 30 to about 150° C.

Examples of such epoxy-containing acrylic resins include those obtained by radical copolymerization of epoxy-containing radically polymerizable unsaturated monomers as essential monomer components with other unsaturated monomers.

Examples of epoxy-containing radically polymerizable unsaturated monomers include glycidyl(meth)acrylate, methylglycidyl(meth)acrylate, etc. Examples of other unsaturated monomers include methyl(meth)acrylate, ethyl(meth)acrylate, isobutyl(meth)acrylate, tert-butyl(meth)acrylate, n-butyl (meth)acrylate, 2-ethylhexyl(meth)acrylate, stearyl (meth)acrylate, styrene, vinyltoluene, α-methylstyrene, (meth)acrylonitrile, (meth)acrylamide, hydroxyethyl (meth)acrylate, hydroxypropyl(meth)acrylate, etc.

Examples of polycarboxylic acid compounds include dodecanedicarboxylic acid, decanedicarboxylic acid, adipic acid, sebacic acid, 1,3,6-hexanetricarboxylic acid, etc.

(v) Combinations of Hydroxy-Containing Acrylic Resins and Blocked Polyisocyanate Compounds The hydroxy-containing acrylic resins preferably have a hydroxy value of about 20 to about 200 KOH mg/g, a softening temperature of about 50 to about 150° C., and a weight average molecular weight of about 1,000 to about 10,000. The hydroxy value is more preferably about 25 to about 80 KOH mg/g; the softening temperature is more preferably about 70 to about 140° C.; and the weight average molecular weight is more preferably about 2,000 to about 80,000.

Examples of such hydroxy-containing acrylic resins include those obtained by radical copolymerization of hydroxy-containing radically polymerizable unsaturated monomers as essential monomer components with other unsaturated monomers.

Examples of hydroxy-containing radically polymerizable unsaturated monomers include hydroxyethyl(meth)acrylate, hydroxypropyl(meth)acrylate, etc. Examples of other unsaturated monomers include methyl(meth)acrylate, ethyl(meth)acrylate, isobutyl(meth)acrylate, tert-butyl(meth)acrylate, n-butyl (meth)acrylate, 2-ethylhexyl(meth)acrylate, stearyl (meth)acrylate, styrene, vinyltoluene, α-methylstyrene, (meth)acrylonitrile, (meth)acrylamide, etc.

Usable blocked polyisocyanate compounds include those mentioned in (i) above.

The starting powder coating materials may contain coloring pigment(s) so that they have various hues.

Known coloring pigments can be used without limitation. Usable coloring pigments include, for example, titanium dioxide, iron oxide, red oxide, carbon black, various calcined pigments, and other inorganic coloring pigments; and phthalocyanine blue, phthalocyanine green, quinacridone pigments, isoindolinone pigments, azo pigments, acetolone pigments, and other organic coloring pigments. Also usable as coloring pigments are aluminum powder and other metal powders; stainless steel flakes and other metal flakes; mica, micaceous iron oxide (MIO, flaky iron oxide), glass flakes, pearly mica, and other nacreous pigments; etc. Usable coloring pigments further include resin-coated aluminium powders, silica-coated aluminium powders, fluorine compound-coated aluminium powders, titanium-coated mica, hastelloy-coated glass flakes, etc. Such coloring pigments can be used singly or in combination.

Further, when necessary, the starting powder coating materials may contain light-storing pigments, extender pigments, rust preventive pigments, etc. Light-storing pigments include, for example, zinc sulfide, strontium aluminate, calcium aluminate, barium aluminate, magnesium aluminate, etc. The starting powder coating materials may further contain compounds containing europium, dysprosium, neodymium, etc., as activating agents for light-storing pigments.

Usable extender pigments include, for example, calcium carbonate, glass fibers, silica, talc, barium sulfate, kaoline, etc.; and usable rust preventive pigments include, for example, zinc powder, aluminum dihydrogen tripolyphosphate, etc.

Furthermore, when necessary, the starting powder coating materials may contain additives such as surface controlling agents, curing accelerators, sagging inhibitors, UV absorbers, light stabilizers, antioxidants, dyes, etc.

Each of the starting powder coating materials can be produced, for example, as follows. The base resin, or the base resin and curing agent, optionally together with coloring pigment(s), light-storing pigment(s), extender pigment(s), rust preventive pigment(s), additive(s), etc., are dry blended, and then the obtained blend is kneaded at a temperature at which the resin melts, to achieve homogeneity. Subsequently, the kneaded product is cooled, and the resulting pellets are ground and classified to obtain a powder coating material having a mean particle diameter of usually not more than about 50 μm, and more preferably about 1 to about 40 μm.

In order to improve the fluidity, blocking resistance, etc., fine powders of, for example, aluminum oxide, silica, or the like, may be added to the starting powder coating materials by dry blending.

As used herein, "mean particle diameter" is a particle size ($D_{50}$) obtained as follows: the particle size distribution of the classified starting powder coating material is measured using a conventional particle size distribution meter; the measured particle diameters are integrated from the smallest particle diameter; and the particle size at which the integrated value reaches 50% is defined as $D_{50}$. The particle size distribution can be measured based on the intensity patterns of diffraction and scattering caused by irradiating the particles with light. Such measurement is possible because the intensity patterns depend on particle size.

Commercially available particle size distribution meters are usable, including, for example, "Microtrack 9220FRA" and "Microtrack HRA" (tradenames of Nikkiso Co., Ltd.); "COULTER MURTISIZER" (tradename of Beckman Coulter, Ltd.); and the like. Measurement using a particle size distribution meter may be carried out, for example, as follows. Thirty milliliters of water is placed in a container, and 0.01 to 0.1 g of neutral detergent is added, followed by stirring. Then, 0.01 to 0.2 g of measurement sample is added, and ultrasonically dispersed while being stirred, and the resulting dispersion is subjected to particle size distribution measurement.

Liquid Binder

In the present invention, the liquid binder binds and granulates particles of the plurality of starting powder coating materials that are different from each other in hue and/or kind of base resin, to form a composite powder coating composition.

The liquid binder is a solution or dispersion of a binder compound having a softening temperature of about 30 to about 200° C. and containing a self-crosslinkable functional group or groups and/or a functional group or groups that complementarily react with functional groups of the starting powder coating materials, in a solvent that does not dissolve the starting powder coating materials.

The most suitable solvent is selected and used, since solubility in the solvent varies greatly among the types of starting powder coating materials and binder compound. It is particularly preferable to use a solvent that comprises water and/or a hydrophilic solvent as a main component, since use of such a solvent enables easy and homogeneous binding of particles of the powder coating materials. It is also possible to use a hydrocarbon solvent. Further, when using water as a solvent, a surfactant can be used as required, in order to disperse the binder compound in water. Examples of usable surfactants include nonionic surfactants, anionic surfactants, cationic surfactants, amphoteric surfactants, etc.

The solvent is preferably removed from the composite powder coating composition after binding, and therefore preferably has a boiling point lower than the softening temperatures of the starting powder coating materials. Solvents with such a boiling point can be easily removed from the composite powder coating composition, without deterioration of the plurality of starting powder coating materials. Solvents having a boiling point as low as 150° C. or less are particularly preferable.

Usable solvents include, for example, water; alcohols and other hydrophilic solvents; hydrocarbon solvents; etc. Examples of alcohols include methanol, ethanol, propanol, etc. Examples of hydrocarbon solvents include hexane, heptane, octane, benzene, petroleum naphtha, etc.

Solvents comprising alcohols as main components are particularly preferable. This is because alcohols improve wetting of the surfaces of the starting powder coating material particles to thereby help the binder compound adhere to the surfaces of the coating material particles.

The proportion of solvent is preferably such that the liquid binder has a binder compound solids content of about 1 to about 50 wt. %. Such a proportion of solvent can be easily removed from the composite powder coating composition without deterioration of the plurality of starting powder coating materials. More preferably, the liquid binder has a binder compound solids content of about 2 to about 30 wt. %. When the solids content is less than 1 wt. %, the amount of solvent is so large that, due to the necessity of removing a large amount of solvent, the production time may be prolonged and the powder coating materials may be deteriorated or deformed. When the solids content is more than 50 wt. %, the amount of compound that is present between the bound coating material particles is less than in the case where the solids content is low (e.g., 10 wt. %), even if the compound solids content is the same. Thus, binder compound solids contents outside the above range are not preferable.

The proportion of liquid binder is about 0.1 to about 20 parts by weight, on a solid basis, per 100 parts by weight of the starting powder coating materials. Use of such a proportion of liquid binder makes it possible to obtain a coating film having both excellent flooding resistance and excellent blocking resistance. The proportion is more preferably about 1 to about 10 parts by weight. When the proportion is less than 0.1 parts by weight, a large proportion of powder coating material particles remain unbound, resulting in poor film properties such as poor film appearance and the like. A proportion of more than 20 parts by weight results in poor film properties such as low water resistance, poor film appearance (seeding and the like), low weather resistance, etc. Thus, proportions outside the above range are not preferable.

The binder compound has a softening temperature of about 30 to about 200° C., and preferably about 40 to about 180° C. When the softening temperature is less than 30° C., the composite powder coating composition has low blocking resistance, whereas when it is more than 200° C., the coating film has poor smoothness. Thus, proportions outside the above range are not preferable.

As used herein, blocking resistance means resistance to blocking phenomenon, i.e., a phenomenon in which particles of a powder coating material stored under certain conditions adhere to each other and thereby form blocks.

The binder compound for use in the present invention is a self-curing binder compound having a self-crosslinkable functional group or groups (hereinafter this binder compound is sometimes referred to simply as "self-crosslinkable binder"), and/or a binder compound having a functional group or groups that complementarily react with functional groups of the starting powder coating materials, when the starting powder coating materials contain functional groups (hereinafter this binder compound is sometimes referred to simply as "complementarily crosslinkable binder").

Self-Crosslinkable Binder

The self-crosslinkable binder may be the following (1) or (2).

(1) A binder that is a compound in which self-crosslinkable functional groups in the same molecule react with each other. The self-crosslinkable functional groups in this compound may be the same type of crosslinkable functional groups that undergo condensation reactions, cationic polymerization reactions, or like crosslinking reactions; or different types of crosslinkable functional groups that undergo esterification reactions or like crosslinking reactions.

(2) A binder that is a combination of two substances, i.e., a crosslinkable functional group-containing resin and a curing agent having functional group(s) that react with the crosslinkable functional group(s)

Examples of such self-crosslinkable binders include binders containing shellac resins, amino-curable resins, isocyanate-curable resins, epoxy-curable resins, silicon-curable resins, oxazoline-curable resins, aziridine-curable resins, etc., as thermosetting resin components. Use of such thermosetting resins improves film properties such as film appearance, water resistance, weather resistance, etc. In particular, when using shellac resins, amino-curable resins, or epoxy-curable resins, film properties such as film appearance, corrosion resistance, etc. are further improved.

Shellac resins are natural thermosetting resins purified from the secretions of scale insects that infest leguminous plants or mulberry plants, and are curable by themselves when heated. Shellac resins are soluble in lower alcohols (mainly $C_1$-$C_4$ monovalent alcohols) at room temperature, and, after being thermally cured, are sparingly soluble in organic solvents, such as aqueous solvents (excluding warm alkaline water), ester solvents, lower alcohols, etc. Thus, they are excellent components for coating materials. Preferable scale insects are lac insects. Examples of leguminous plants include lebbek, guango, *Acacia catechu*, pigeon pea, babul, etc. Examples of mulberry plants include *Akou* (*Ficus superba* var. *japonica*.), pipal, etc.

As such shellac resins, bleached white shellac resins, dewaxed shellac resins, and the like are commercially available and are usable in the present invention without limitation. Although the chemical structure of shellac resin has not been completely elucidated, shellac resins contain as a main component a polyester comprising at least aleuritic acid and shellolic acid or a derivative thereof represented by the following formulae, and presumably, the hydroxy groups present in such a structure contribute to the advantageous properties as a binder. Further, the presence of butoric acid, palmitic acid, myristic acid, etc. is confirmed in such resins.

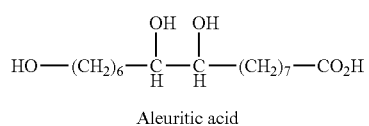

Aleuritic acid

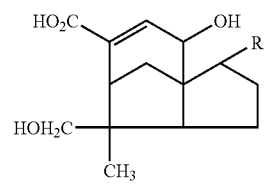

R:$CO_2H$ - Shellolic acid
:CHO - Jalaric acid
:$CH_2OH$ - Laksholic acid

Shellolic acid and derivatives thereof

Shellac resins that can be used in the present invention include not only natural shellac resins, but also resins that are chemically synthesized based on aleuritic acid, shellolic acid and derivatives thereof and that exhibit the same effects as above.

Usable amino-curable resins include mixtures of amino resins, such as aqueous melamine resins, aqueous urea resins, aqueous melamine resins, etc., and aqueous curable resins having functional groups (active hydrogen groups, such as hydroxy groups or the like) that react with amino resins. The kinds of such aqueous curable resins are, for example, acrylic resins, polyester resins, silicon resins, etc.

Usable isocyanate-curable resins include mixtures of water-dispersible polyisocyanate compounds and aqueous curable resins having functional groups (active hydrogen groups, such as hydroxy groups or the like) that react with isocyanate groups. The kinds of such aqueous curable resins are, for example, acrylic resins, polyester resins, silicon resins, etc.

Usable epoxy-curable resins include, for example, mixtures of aqueous epoxy resins and aqueous curable resins having functional groups (active hydrogen groups, such as carboxy groups or the like) that react with epoxy groups. The kinds of such aqueous curable resins are, for example, acrylic resins, polyester resins, silicon resins, etc.

Usable silicon-curable resins include hydrolyzable silane group-containing aqueous compounds.

Usable oxazoline-curable resins include mixtures of polyoxazoline compounds and aqueous curable resins having functional groups (active hydrogen groups such as carboxy groups or the like) that react with oxazoline groups of the above compounds. The kinds of such aqueous curable resins are, for example, acrylic resins, polyester resins, silicon resins, etc.

Usable aziridine-curable resins include mixtures of polyaziridine compounds and aqueous curable resins having functional groups (active hydrogen groups such as hydroxy groups, carboxy groups, or the like) that react with aziridine groups of the above compounds. The kinds of such aqueous curable resins are, for example, acrylic resins, polyester resins, silicon resins, etc.

The self-crosslinkable binder itself, as well as physically binding powder coating material particles together, is crosslinked by the heat applied when forming a coating film. Thus, even if the binder as such is hydrophilic, the heat-cured coating film has no hydrophilicity and shows excellent film properties such as water resistance, weather resistance, etc.

Shellac resins are especially preferable as self-crosslinkable binders, since they highly effectively bind powder coating material particles together and do not have adverse effects on film properties after baking.

Complementarily Crosslinkable Binder

The complementarily crosslinkable binder is a compound having functional group(s) that complementarily react with functional group(s) of the starting powder coating material(s) when at least one of the coating materials contains functional group(s). Such compounds include, for example, β-hydroxyalkylamide compounds, carboxylic acids, polyols, oxazoline compounds, etc. Use of such compounds improves film properties such as film appearance, weather resistance, etc.

Examples of combinations of complementarily crosslinkable binders and starting powder coating materials having functional groups include combinations of β-hydroxyalkylamide compounds and carboxy-containing resins as powder coating materials; combinations of polycarboxylic acids and epoxy-containing resins as powder coating materials; combinations of polyols and blocked polyisocyanate group-containing powder coating materials; combinations of oxazoline compounds and carboxy-containing powder coating materials; combinations of oxazoline compounds and epoxy-containing powder coating materials; etc.

When using a complementarily crosslinkable binder in combination with starting powder coating material(s) having functional group(s), the binder and powder coating material particles undergo a curing reaction and chemically bind to each other, when heated to form a coating film. This makes the heat-cured coating film unhydrophilic even if the binder itself is hydrophilic, so that the coating film has excellent film properties such as water resistance, weather resistance, etc.

Usable β-hydroxyalkylamide compounds include compounds each having at least two β-hydroxyalkylamide groups per molecule. For example, compounds represented by the following formula (I) are preferable.

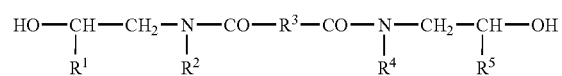

wherein $R^1$ and $R^5$ each independently represent a $C_{1-4}$ alkyl group or a hydrogen atom; $R^3$ represents a divalent aliphatic group, a cyclic aliphatic group, or an aromatic group; $R^2$ and $R^4$ each independently represent a $C_{1-4}$ alkyl group, a group represented by the formula

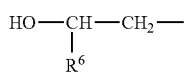

or a hydrogen atom; and $R^6$ represents a $C_{1-4}$ alkyl group or a hydrogen atom.

Examples of $C_{1-4}$ alkyl groups include methyl, ethyl, n-propyl, isopropyl, n-butyl, tert-butyl, etc. Examples of divalent aliphatic groups include methylene, ethylene, propylene, etc. Examples of divalent cyclic aliphatic groups include cyclohexylene and the like. Examples of divalent aromatic groups include phenylene and the like.

Preferable specific examples of β-hydroxyalkylamide compounds include N,N-di(β-hydroxyethyl)acetamide, bis(β-hydroxyethyl)adipoamide, bis(β-hydroxypropyl)adipoamide, bis[N,N-di(β-hydroxyethyl)]adipoamide, bis[N,N-di(β-hydroxypropyl)]adipoamide, etc.

Commercially available β-hydroxyalkylamide compounds can be used. Examples of such β-hydroxyalkylamide compounds include "Primid XL552" and "Primid QM-1260" (tradenames of EMS inventa AG) and the like.

Preferable specific examples of polycarboxylic acids include 1,3,6-hexanetricarboxylic acid and other hydrophilic polycarboxylic acids; polycarboxylic acids that can be neutralized with bases and thereby dispersed in water, such as adipic acid, suberic acid, sebacic acid, azelaic acid, etc.

Usable polyols include, for example, 2,3-butylene glycol, neopentyl glycol, trimethylolpropane, sorbitol, 1,4-cyclohexanedimethanol, etc.

Examples of oxazoline compounds include 2,2'-bis-(2-oxazoline), 2,2'-methylene-bis-(2-oxazoline), 2,2'-ethylene-bis-(2-oxazoline), 2,2'-trimethylene-bis-(2-oxazoline), 2,2'-tetramethylene-bis-(2-oxazoline), 2,2'-hexamethylene-bis-(2-oxazoline), 2,2'-octamethylene-bis-(2-oxazoline), 2,2'-ethylene-bis-(4,4-dimethyl-2-oxazoline), 2,2'-(1,3-phenylene)-bis-(2-oxazoline), 2,2'-(1,3-phenylene)-bis-(4,4-dimethyl-2-oxazoline), 2,2'-(1,4-phenylene)-bis-(2-oxazoline), bis-(2-oxazolinylcyclohexane)sulfide, bis-(2-oxazolinylnorbornane)sulfide, and other dioxazoline compounds; and 2,2'-(1,2,4-phenylene)-tris-(2-oxazoline) and other trioxazoline compounds.

Also usable as oxazoline compounds are oxazoline polymers, i.e., homopolymers of oxazoline monomers or copolymers of oxazoline monomers with other copolymerizable unsaturated monomers.

Examples of oxazoline monomers include 2-vinyl-2-oxazoline, 2-vinyl-4-methyl-2-oxazoline, 2-vinyl-5-methyl-2- oxazoline, 2-isopropenyl-2-oxazoline, 2-isopropenyl-4-methyl-2-oxazoline, 2-isopropenyl-5-ethyl-2-oxazoline, and other addition polymerizable monomers. At least one monomer selected from such monomers can be used.

The other copolymerizable unsaturated monomers are not limited, as long as they are copolymerizable with oxazoline monomers and do not react with oxazoline groups. Specifically, such monomers include, for example, methyl(meth)acrylate, ethyl (meth)acrylate, isobutyl(meth)acrylate, tert-butyl (meth)acrylate, n-butyl(meth)acrylate, 2-ethylhexyl (meth)acrylate, stearyl(meth)acrylate, styrene, vinyltoluene, α-methylstyrene, (meth)acrylonitrile, (meth)acrylamide, hydroxyethyl(meth)acrylate, hydroxypropyl(meth)acrylate, etc. At least one monomer selected from such monomers can be used.

Commercial products of such oxazoline polymers are usable, including, for example, "Epocros WS-500", "Epocros WS-700", "Epocros K-2010", "Epocros K-2020", and "Epocros K-2030" (tradenames of Nippon Shokubai Co., Ltd.).

β-Hydroxyalkylamide compounds are preferable as complementarily crosslinkable binders since they are highly effective in binding powder coating material particles to each other and do not adversely affect the properties of the heat-cured coating film.

The composite powder coating composition of the present invention is obtained by granulating, using the above-mentioned liquid binder, a plurality of starting powder coating materials that are different from each other in hue and/or kind of base resin, and drying the granules. In the composite powder coating composition, particles of the coating materials are bound in such strength that the composite powder coating composition, when applied by powder coating using, for example, an electrostatic powder coating device, is not disintegrated into starting powder coating material particles. It is not necessary that all the particles of the starting powder coating materials be bound, and it is sufficient if the particles are bound to such an extent that the continuous coating film obtained from the composite powder coating composition has a visually uniform hue.

The granulation of the composite powder coating composition particles can be confirmed from the mean particle diameter and by optical microscopic observation.

The mean particle diameters before and after the granulation vary depending on the mean particle diameter and proportion of the plurality of starting powder coating materials, the proportion of the liquid binder, and other factors. It is usually preferable that the mean particle diameter of the granulated composite powder coating composition be about 1 to about 50 μm greater, and more preferably about 2 to about 40 μm greater, than the mean particle diameter of the starting powder coating materials.

It is generally preferable that the mean particle diameter of the starting powder coating materials be not more than about 50 μm, and more preferably about 1 to about 40 μm. When using starting powder coating materials having a mean particle diameter of not more than about 50 μm, film properties such as film appearance are further improved.

It is preferable that the mean particle diameter of the granulated and dried composite powder coating composition be about 10 to about 60 μm, and more preferably about 12 to about 50 μm. When the mean particle diameter is smaller than about 10 μm, the transfer efficiency of electrostatic coating tends to decrease, whereas when it is greater than about 60 μm, smoothness and other properties of the coating film tend to decrease. Thus, mean particle diameters outside the above range are not preferable.

In order to improve the fluidity and blocking resistance, fine particles of, for example, aluminum oxide, silica, etc., can be added to the composite powder coating composition of the present invention by dry blending.

When the composite powder coating composition of the present invention is applied to a substrate and heated, the binder compound is cured so as to form, together with particles of the powder coating materials, a coating film. The cured coating film has excellent properties such as excellent film appearance, high water resistance, high weather resistance, etc., and has a highly uniform hue because mottling is unlikely to be developed.

The composite powder coating composition of the present invention can be used not only as a powder coating composition, but also in the fields of inks, toners, moldings, laminates, and the like. The composition can also be used for modifying particles of various powders other than coating compositions.

The composite powder coating composition of the present invention can be applied to a substrate by, for example, electrostatic coating, fluidized-dipping, spray coating, in-mold coating, heat lamination, and other processes. The applied composition is then heated using a hot air furnace, infrared furnace, or induction heating furnace, or by hot pressing, or by other methods, to thereby form a cured coating film.

In the composite powder coating composition of the present invention, particles of the plurality of starting powder coating materials are firmly bound together. Therefore, in particular when applied by electrostatic coating, the particles forming the composite powder coating composition do not separate from each other and thus do not adhere to the coater, and especially to the tip portion of the coater, thus achieving excellent application workability. Application by electrostatic coating is described below.

The composite powder coating composition of the present invention can be formed into a cured film by being applied to any one of various metal substrates by electrostatic powder coating and heated. This provides a coated article comprising a metal substrate and a coating film formed on the substrate.

Usable metal substrates include, for example, steel, alloy steel, and other iron-based metal materials; aluminum, stainless steel, zinc, tin, copper, titanium, magnesium, brass, and other non-iron metals and alloys thereof; galvanized steel sheets, tin-plated steel sheets, and other plated metal materials; surface-treated metal materials that have been subjected to chemical conversion treatment with chromic acid or the like; surface-treated metal materials that have been subjected to chemical conversion treatment with non-chromium compounds such as phosphate compounds, titanium compounds, zirconium compounds, organic metal salts, etc; aluminum metal materials and alloys thereof that have been treated by anodization, sealing of pores, etc.; and the like. Examples of metal substrates include automobile bodies; aluminum wheels, iron wheels, stainless steel wheels, magnesium alloy wheels, and other automobile parts; building materials; gas cylinders and other containers; trains and other vehicles; vessels; household electrical appliances; business equipment, etc. When necessary, such metal substrates may be undercoated in advance.

The coating film formed from the composite powder coating composition of the present invention preferably has a thickness of about 30 to about 250 μm (when heat-cured), and more preferably about 60 to about 150 μm (when heat-cured). A coating film thickness of less than 30 μm is likely to result in low film smoothness, causing defects in film appearance, such as conspicuous seeding. A coating film thickness of more than 250 µm may result in foaming, a rough surface due to electrostatic repulsion, etc.

The composite powder coating composition is preferably heated at a metal substrate surface temperature of about 130 to about 350° C. for about 30 seconds to about 60 minutes; and more preferably at a metal substrate surface temperature of about 140 to about 250° C. for about 1 to about 50 minutes.

Process for Producing Composite Powder Coating Composition

The composite powder coating composition production process of the present invention comprises the steps of (1) dry blending of a plurality of starting powder coating materials that are different from each other in hue and/or kind of base resin; (2) granulating the resulting blend by adding a liquid binder obtained by dissolving or dispersing, in a solvent that does not dissolve the starting powder coating materials, a binder compound having a softening temperature of 30 to 200° C. and containing a self-crosslinkable functional group or groups and/or a functional group or groups that complementarily react with functional groups of the starting powder coating materials; and (3) drying the granules.

The production process gives a composite powder coating composition of the present invention, in which particles of the starting powder coating materials are firmly bound together.

The starting powder coating materials, binder compound, and solvent that dissolves or disperses the compound but does not dissolve the powder coating materials, etc., used in the production process of the present invention are the same as those described for the composite powder coating composition.

Step (1) is a step of dry blending a plurality of starting powder coating materials. The proportion of the dry blended starting powder coating materials is not limited, and the two or more starting powder coating materials can be used in an arbitrary proportion so that the resulting composite powder coating composition has a desired hue.

The apparatus used for dry blending is not limited, and known agitators are usable, including, for example, Henschel mixers, super mixers, high speed mixers, etc. Since temperature is increased by the friction between particles of the powder coating materials during dry blending, it is preferable to perform agitation with cooling so as to maintain a temperature at which the coating material particles do not fuse together.

Step (2) is a step of adding a liquid binder to the blend obtained in step (1) to granulate the blend into a particle size within a range that is suitable for coating. The liquid binder is added by dropping, spraying, or like method. The apparatus used for granulation is not limited, and known agitators are usable, including, for example, Henschel mixers, super mixers, high speed mixers, etc.

The dry blending step (1) and granulation step (2) are usually carried out continuously. The temperature and time for the two steps are not limited, but are preferably about 5 to about 40° C. and about 0.5 minutes to about 24 hours, and more preferably about 8 to about 30° C. and about 1 minute to about 1 hour.

For example, when using a high speed mixer, the agitator speed and chopper speed are preferably about 100 to about 5,000 rpm and about 1,000 to about 10,000 rpm, respectively; and more preferably about 200 to about 2,000 rpm and about 2,000 to about 6,000 rpm, respectively.

The dry blending step (1) and granulation step (2) can also be carried out using a combined agitation mixer or stream agitation mixer.

Step (3) is a step of drying the granules obtained in step (2) to remove the solvent in the liquid binder used.

Drying is carried out by, for example, drying under reduced pressure, supplying air, or the like. In the case of drying under reduced pressure, the temperature conditions vary depending on the softening temperatures of the powder coating materials, melt viscosity, production quantity, etc., and thus can be suitably selected according to the powder coating materials used. Generally, drying under reduced pressure is carried out at about 10 to about 80° C., and preferably about 30 to about 50° C., for about 1 minute to about 20 hours, and preferably about 5 minutes to about 10 hours.

When drying is carried out by supplying air, in view of production operation efficiency, the supplied air is preferably heated air. The temperature of the air can be suitably selected, as long as it is lower than the softening temperature of the powder coating material particles. When the temperature is not lower than the softening temperature, the powder coating material particles are softened, causing blocking of the coating material particles.

The temperature of the drying air is generally about 20 to about 120° C., and preferably about 40 to about 100° C. The timing of supplying air can be suitably determined. For example, heated air can be supplied after or during addition of the liquid binder, followed by cooling.

It is generally preferable that the mean particle diameter of the starting powder coating materials before granulation be not more than about 50 µm, and more preferably about 1 to about 40 µm, from the viewpoint of excellent workability. Further, it is preferable that the mean particle diameter of the granulated and dried composite powder coating composition be about 10 to about 60 µm, and more preferably about 12 to about 50 µm, from the viewpoint of excellent transfer efficiency of electrostatic powder coating.

Method for Color Matching Composite Powder Coating Composition

The color matching method of the present invention comprises the steps of (1) dry blending a plurality of starting colored powder coating materials having different hues for color matching; (2) granulating the resulting blend by adding a liquid binder obtained by dissolving or dispersing, in a solvent that does not dissolve the starting powder coating materials, a binder compound having a softening temperature of 30 to 200° C. and containing a self-crosslinkable functional group or groups and/or a functional group or groups that complementarily react with functional groups of the starting powder coating materials; and (3) drying the granules.

The starting colored powder coating materials, binder compound, and solvent that dissolves or disperses the compound but does not dissolve the powder coating materials, etc., used in the color matching method of the present invention are the same as those described for the composite powder coating composition.

Step (1) is a step of dry blending a plurality of starting colored powder coating materials for color matching. The proportion of the dry blended starting colored powder coating materials is not limited, and the two or more starting powder coating materials can be used in such a proportion that the resulting composite powder coating composition has a desired hue.

If the relations between the proportions of colored powder coating materials and the colors of the resulting coating films have previously been input into a computer, the proportion of the plurality of colored powder coating materials for obtaining the desired color can be automatically determined in Step (1). That is, a computer color matching method can be applied in this step to automate the step and thereby facilitate color matching.

The color matching method of the present invention can be carried out via the same steps as those of the composite powder coating composition production process described above, except that color matching is performed in the dry blending step (1).

The dry blending step (1) for color matching and granulation step (2) in the color matching method of the present invention can be carried out using the same type of agitator and under the same conditions as in the composite powder coating composition production process of the present invention. The granule drying step (3) can be carried out in the same manner as the drying step (3) in the composite powder coating composition production process of the present invention.

The color-matched composite powder coating composition with the desired hue obtained by the color matching method of the present invention can be used as the above-mentioned composite powder coating composition of the present invention.

EFFECTS OF THE INVENTION

The present invention achieves the following remarkable effects.

(1) The composite powder coating composition of the present invention is capable of forming on a substrate a coating film that is free of flooding and is excellent in film properties such as film appearance, film smoothness, water resistance, weather resistance, adhesion, etc. Presumably, this is because the plurality of starting powder coating materials are homogeneously and firmly adhered together to form granules, so that the resulting coating film has a highly uniform hue, i.e., has fine texture and is free from mottling; and because particles of the powder coating materials having different colors are not easily separated during application of the coating composition.

(2) In the composite powder coating composition of the present invention, the binder compound that binds coating material particles is cured during formation of the coating film, thereby providing a coating film that is excellent in film properties such as water resistance, weather resistance, etc.

(3) Particles of the composite powder coating composition can be recovered and reused.

(4) In view of the above, the composite powder coating composition of the present invention can be widely used in industrial paint applications for forming decorative or protective coating films, and is very useful in practice from economical and resource-saving point of view.

(5) In the production process and color matching method for a composite powder coating composition according to the present invention, color matching, and production of multiple colors in small amounts, can be easily carried out.

BEST MODE FOR CARRYING OUT THE INVENTION

The following Examples and Comparative Examples are provided to illustrate the present invention in further detail, and are not intended to limit the scope of the invention.

The starting powder coating materials and liquid binders used in the Examples and Comparative Examples are as follows.

1. Powder Coating Materials

A. Thermosetting Polyester Powder Coating Materials (A1) "Evaclad #4800 White": tradename of Kansai Paint Co., Ltd.; a white-colored blocked isocyanate-curable polyester resin powder coating material that has a mean particle diameter of about 30 μm and forms a coating film having a brightness $L^*$ of about 95 according to the $L^*a^*b^*$ color system (JIS Z 8729)

(A2) "Evaclad #4800 Gray": tradename of Kansai Paint Co., Ltd.; a gray-colored blocked isocyanate-curable polyester resin powder coating material that has a mean particle diameter of about 30 μm and forms a coating film having a brightness $L^*$ of about 70 according to the $L^*a^*b^*$ color system (JIS Z 8729)

(A3) "Evaclad #4800 Yellow": tradename of Kansai Paint Co., Ltd.; a yellow-colored blocked isocyanate-curable polyester resin powder coating material that has a mean particle diameter of about 30 μm and forms a coating film having a brightness $L^*$ of about 84 according to the $L^*a^*b^*$ color system (JIS Z 8729)

(A4) Transparent powder coating material having the same composition as that of "Evaclad #4800 White" except for the absence of coloring pigments: a blocked isocyanate-curable polyester resin powder coating material having a mean particle diameter of about 30 μm (A5) "Evaclad #3850 White": tradename of Kansai Paint Co., Ltd.; a white-colored epoxy-polyester hybrid resin powder coating material that has a mean particle diameter of about 30 μm and forms a coating film having a brightness $L^*$ of about 95 according to the $L^*a^*b^*$ color system (JIS Z 8729)

(A6) Transparent powder coating material having the same composition as that of "Evaclad #3850 White" except for the absence of coloring pigments: an epoxy-polyester hybrid resin powder coating material having a mean particle diameter of about 30 μm B. Thermosetting Epoxy Powder Coating Material (B1) "Evaclad #3000 White": tradename of Kansai Paint Co., Ltd.; a white-colored amino-curable epoxy resin powder coating material that has a mean particle diameter of about 30 μm and forms a coating film having a brightness $L^*$ of about 95 according to the $L^*a^*b^*$ color system (JIS Z 8729)

(B2) Transparent powder coating material having the same composition as that of "Evaclad #3000 White" except for the absence of coloring pigments: an amino-curable epoxy resin powder coating material having a mean particle diameter of about 30 μm C. Thermosetting Acrylic Powder Coating Material (C1) "Evaclad #5000 White": tradename of Kansai Paint Co., Ltd.; a white-colored acid-curable acrylic resin powder coating material that has a mean particle diameter of about 30 μm and forms a coating film having a brightness $L^*$ of about 95 according to the $L^*a^*b^*$ color system (JIS Z 8729)

(C2) Gray-colored powder coating material having the same composition as that of "Evaclad #5000 White" except for containing a black pigment in such an amount that the coating film has a brightness $L^*$ of about 70 according to the $L^*a^*b^*$ color system (JIS Z 8729): mean particle diameter of about 30 μm (C3) Transparent powder coating material having the same composition as that of "Evaclad #5000 White" except for the absence of coloring pigments: an acid-curable acrylic resin powder coating material having a mean particle diameter of about 30 μm 2. Liquid Binder (a) Liquid binder with a solids content of 2 wt. % obtained by dissolving 2 g of a shellac resin available under the tradename "Dry Transparent White Lac" (product of The Japan Shellac Resin Industries, Ltd.; softening temperature: 70 to 75° C.) in 98 g of methanol (b) Liquid binder with a solids content of 2 wt. % obtained by dissolving 2 g of "Primid XL552" (tradename of EMS-Inventa AG; softening temperature: about 120° C.) in 98 g of methanol (c) Liquid binder with a solids content of 2 wt. % obtained by dissolving 2 g of 1,3,6-hexanetricarboxylic acid (softening temperature: 112° C.) in 98 g of methanol (d) Liquid binder with a solids content of 2 wt. % obtained by dispersing in water a neutralized product of adipic acid (softening temperature: 153° C.) with triethanolamine (e) Liquid binder having a solids content of 2 wt. % obtained by dissolving 2 g of neopentyl glycol (softening temperature: about 129° C.) in 98 g of methanol (f) Liquid binder with a solids content of 2 wt. % obtained by diluting "Epocros WS-500" (tradename of Nippon Shokubai Co., Ltd.; a 40 wt. % solution of acrylic resin-modified oxazoline in water/methoxypropanol (weight ratio: 1/1)) with water/methanol (weight ratio: 1/1)

(g) Liquid binder with a solids content of 2 wt. % obtained by adding 20 g of "Primid XL552" to 100 g (solids) of a neutralized product of a polyester aqueous resin (reaction product of 1 mol of trimellitic anhydride, 2 mol of adipic acid, 1 mol of ethylene glycol, and 1 mol of trimethylolpropane; acid value: about 240 mg KOH/g; softening temperature: about 100° C.) with triethylamine (neutralization equivalent: 1.0) and diluting the resulting mixture with water/methanol (weight ratio: 1/1)

(h) Liquid binder with a solids content of 2 wt. % obtained by adding 20 g of "Primid XL552" to a neutralized product of an aqueous acrylic resin (copolymer of 40 g of methyl methacrylate, 20 g of styrene, 10 g of butyl methacrylate, and 30 g of acrylic acid; acid value: about 230 mg KOH/g; average molecular weight: about 5,000; softening temperature: about 95° C.) with triethylamine (neutralization equivalent: 1.0) and diluting the resulting mixture with water/methanol (weight ratio: 1/1)

EXAMPLE 1

One hundred grams of "Evaclad #4800 White" and 10 g of "Evaclad #4800 Gray" were added to a high speed mixer (product of Fukae Industries Co., Ltd.; capacity: 2 l), and dry blended by agitation at an agitator speed of 600 rpm and a chopper speed of 4,000 rpm for one minute. Thereafter, under the same agitation conditions, 2 g (on a solids basis) of liquid binder (a) was added by spraying over a period of 10 minutes, and granulation was performed by continuing agitation for 10 minutes under the same agitation conditions. The granules were then dried by agitation under reduced pressure at an agitator speed of 100 rpm and a chopper speed of 500 rpm, to thereby obtain a color-matched composite powder coating composition. The temperature during the dry blending and granulation was 25° C., and the temperature during drying under reduced pressure was 40° C.

EXAMPLES 2 TO 45

The coating compositions of Examples 2 to 45 were prepared by following the procedure of Example 1 except for using the starting powder coating materials and liquid binders indicated in Tables 1 to 5.

Tables 1 to 5 show the starting powder coating materials, liquid binders, and $\Delta L^*$ and $\Delta ab$ of the coating films in Examples 1 to 45.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Starting powder coating material (No., color, base resin) | A1, White, Polyester resin | 100 | 100 | 100 | 100 | 100 | 100 | 100 | 100 | 100 | 100 |
| | A2, Gray, Polyester resin | 10 | 10 | 10 | 10 | 10 | 10 | | | | |
| | A3, Yellow, Polyester resin | | | | | | | 10 | 10 | 10 | |
| | A4, Transparent, Polyester resin | | | | | | | | | | 10 |
| | A5, White, Epoxy-polyester hybrid resin | | | | | | | | | | |
| | A6, Transparent, Epoxy-polyester hybrid resin | | | | | | | | | | |
| | B1, White, Epoxy resin | | | | | | | | | | |
| | B2, Transparent, Epoxy resin | | | | | | | | | | |
| | C1, White, Acrylic resin | | | | | | | | | | |
| | C2, Gray, Acrylic resin | | | | | | | | | | |
| | C3, Transparent, Acrylic resin | | | | | | | | | | |
| $\Delta L^*$ of coating film | | 25 | 25 | 25 | 25 | 25 | 25 | 11 | 11 | 11 | — |
| $\Delta ab$ of coating film | | 16< | 16< | 16< | 16< | 16< | 16< | 16< | 16< | 16< | — |
| Liquid binder | a | 2 | | | | 4 | 8 | 2 | | | 2 |
| | b | | | | | | | | | | |
| | c | | | | | | | | | | |
| | d | | | | | | | | | | |
| | e | | 2 | | | | | | | | |
| | f | | | | | | | | | | |

TABLE 1-continued

|  |  | Examples | | | | | | | | | |
|--|--|---|---|---|---|---|---|---|---|---|---|
|  |  | 1 | 2 | 3 | 4 | 5 | 6 | 7 | 8 | 9 | 10 |
|  | g |  |  | 2 |  |  |  |  | 2 |  |  |
|  | h |  |  |  | 2 |  |  |  |  | 2 |  |

TABLE 2

| | | Example | | | | | | | | | |
|--|--|--|--|--|--|--|--|--|--|--|--|
| | | 11 | 12 | 13 | 14 | 15 | 16 | 17 | 18 | 19 | 20 |
| Starting powder coating material (No., color, base resin) | A1, White, Polyester resin | 100 | 100 | 100 | 100 | 100 | | | | | |
| | A2, Gray, Polyester resin | | | 5 | 5 | 5 | | | | | |
| | A3, Yellow, Polyester resin | | | 5 | 5 | 5 | | | | | |
| | A4, Transparent, Polyester resin | 10 | 10 | | | | | | | | |
| | A5, White, Epoxy-polyester hybrid resin | | | | | | 100 | 100 | 100 | | |
| | A6, Transparent, Epoxy-polyester hybrid resin | | | | | | 10 | 10 | 10 | | |
| | B1, White, Epoxy resin | | | | | | | | | 100 | 100 |
| | B2, Transparent, Epoxy resin | | | | | | | | | 10 | 10 |
| | C1, White, Acrylic resin | | | | | | | | | | |
| | C2, Gray, Acrylic resin | | | | | | | | | | |
| | C3, Transparent, Acrylic resin | | | | | | | | | | |
| ΔL* of coating film | | — | — | 11 25 | 11 25 | 11 25 | 25 | 25 | 25 | 25 | 25 |
| Δab of coating film | | — | — | 16< | 16< | 16< | 16< | 16< | 16< | 16< | 16< |
| Liquid binder | a | | | 2 | | | 2 | | | 2 | |
| | b | | | | | | | 2 | | | |
| | c | | | | | | | | 2 | | 2 |
| | d | | | | | | | | | | |
| | e | | | | | | | | | | |
| | f | | | | | | | | | | |
| | g | 2 | | | 2 | | | | | | |
| | h | | 2 | | | 2 | | | | | |

TABLE 3

| | | Example | | | | | | | | | |
|--|--|--|--|--|--|--|--|--|--|--|--|
| | | 21 | 22 | 23 | 24 | 25 | 26 | 27 | 28 | 29 | 30 |
| Starting powder coating material (No., color, base resin) | A1, White, Polyester resin | | | | | | | | | | |
| | A2, Gray, Polyester resin | | | | | | | | | | |
| | A3, Yellow, Polyester resin | | | | | | | | | | |
| | A4, Transparent, Polyester resin | | | | | | | | | | |
| | A5, White, Epoxy-polyester hybrid resin | | | | | | | | | | |
| | A6, Transparent, Epoxy-polyester hybrid resin | | | | | | | | | | |
| | B1, White, Epoxy resin | 100 | 100 | 100 | 100 | | | | | | |
| | B2, Transparent, Epoxy resin | 10 | 10 | 10 | 10 | | | | | | |
| | C1, White, | | | | | 100 | 100 | 100 | 100 | 100 | 100 |

TABLE 3-continued

|  |  | Example | | | | | | | | | |
|---|---|---|---|---|---|---|---|---|---|---|---|
|  |  | 21 | 22 | 23 | 24 | 25 | 26 | 27 | 28 | 29 | 30 |
|  | Acrylic resin |  |  |  |  |  |  |  |  |  |  |
|  | C2, Gray, Acrylic resin |  |  |  |  | 10 | 10 | 10 | 10 | 10 | 10 |
|  | C3, Transparent, Acrylic resin |  |  |  |  |  |  |  |  |  |  |
| $\Delta L^*$ of coating film |  | 25 | 25 | 25 | 25 | 25 | 25 | 25 | 25 | 25 | 25 |
| $\Delta ab$ of coating film |  | 16< | 16< | 16< | 16< | 16< | 16< | 16< | 16< | 16< | 16< |
| Liquid binder | a |  |  |  |  | 2 |  |  |  |  |  |
|  | b |  |  |  |  |  | 2 |  |  |  |  |
|  | c |  |  |  |  |  |  | 2 |  |  |  |
|  | d | 2 |  |  |  |  |  |  |  | 2 |  |
|  | e |  |  |  |  |  |  |  |  |  |  |
|  | f |  | 2 |  |  |  |  |  |  | 2 |  |
|  | g |  |  | 2 |  |  |  |  |  |  | 2 |
|  | h |  |  |  | 2 |  |  |  |  |  |  |

TABLE 4

|  |  | Example | | | | | | | | | |
|---|---|---|---|---|---|---|---|---|---|---|---|
|  |  | 31 | 32 | 33 | 34 | 35 | 36 | 37 | 38 | 39 | 40 |
| Starting powder coating material (No., color, base resin) | A1, White, Polyester resin |  | 50 | 50 | 40 | 40 | 80 | 80 |  |  |  |
|  | A2, Gray, Polyester resin |  |  |  |  |  |  |  |  |  |  |
|  | A3, Yellow, Polyester resin |  |  |  |  |  |  |  |  |  |  |
|  | A4, Transparent, Polyester resin |  |  |  |  |  |  |  |  |  |  |
|  | A5, White, Epoxy-polyester hybrid resin |  | 50 |  |  |  |  |  | 80 | 80 |  |
|  | A6, Transparent, Epoxy-polyester hybrid resin |  |  |  |  |  |  |  |  |  |  |
|  | B1, White, Epoxy resin |  |  |  | 30 | 30 |  |  |  |  | 80 |
|  | B2, Transparent, Epoxy resin |  |  |  |  |  |  |  |  |  |  |
|  | C1, White, Acrylic resin | 100 |  | 50 | 30 | 30 |  |  |  |  |  |
|  | C2, Gray, Acrylic resin | 10 |  |  |  |  |  |  |  |  |  |
|  | C3, Transparent, Acrylic resin |  |  |  |  |  | 20 | 20 | 20 | 20 | 20 |
| $\Delta L^*$ of coating film |  | 25 | 0 | 0 | 0 | 0 | — | — | — | — | — |
| $\Delta ab$ of coating film |  | 16< | 0 | 0 | 0 | 0 | — | — | — | — | — |
| Liquid binder | a |  | 2 | 2 | 2 |  | 2 |  | 2 |  | 2 |
|  | b |  |  |  |  |  |  | 2 |  | 2 |  |
|  | c |  |  |  |  | 2 |  |  |  |  |  |
|  | d |  |  |  |  |  |  |  |  |  |  |
|  | e |  |  |  |  |  |  |  |  |  |  |
|  | f |  |  |  |  |  |  |  |  |  |  |
|  | g |  |  |  |  |  |  |  |  |  |  |
|  | h | 2 |  |  |  |  |  |  |  |  |  |

TABLE 5

|  |  | Example | | | | |
|---|---|---|---|---|---|---|
|  |  | 41 | 42 | 43 | 44 | 45 |
| Starting powder coating material (No., color, | A1, White, Polyester resin |  |  |  |  |  |
|  | A2, Gray, Polyester resin |  |  |  |  |  |
|  | A3, Yellow, Polyester resin |  |  |  |  |  |

TABLE 5-continued

|  |  | Example | | | | |
|---|---|---|---|---|---|---|
|  |  | 41 | 42 | 43 | 44 | 45 |
| base resin) | A4, Transparent, Polyester resin |  | 50 | 50 |  |  |
|  | A5, White, Epoxy-polyester hybrid resin |  |  |  | 50 | 50 |
|  | A6, Transparent, |  |  |  |  |  |

TABLE 5-continued

| | | Example | | | | |
|---|---|---|---|---|---|---|
| | | 41 | 42 | 43 | 44 | 45 |
| | Epoxy-polyester hybrid resin | | | | | |
| | B1, White, Epoxy resin | 80 | | | | |
| | B2, Transparent, Epoxy resin | | | | | |
| | C1, White, Acrylic resin | | | | 50 | 50 |
| | C2, Gray, Acrylic resin | | | | | |
| | C3, Transparent, Acrylic resin | 20 | 50 | 50 | | |
| ΔL* of coating film | | — | — | — | 0 | 0 |
| Δab of coating film | | — | — | — | 0 | 0 |
| Liquid binder | a | | 2 | | 1 | 1 |
| | b | | | 2 | 1 | |
| | c | 2 | | | | 1 |
| | d | | | | | |
| | e | | | | | |
| | f | | | | | |
| | g | | | | | |
| | h | | | | | |

In the above tables, ΔL* of the coating films is a value defined by the formula $\Delta L^* = \Delta L^*_T - \Delta L^*_R$; Δab of the coating films is the square root of the sum of the square of Δa and the square of Δb (see the item of color difference in JIS K5600-4-6).

COMPARATIVE EXAMPLE 1

One hundred grams of "Evaclad #4800 White" and 10 g of "Evaclad #4800 Gray" were added to a high speed mixer (product of Fukae Industries Co., Ltd.; capacity: 2 l), and dry blended by agitation at an agitator speed of 600 rpm and a chopper speed of 4,000 rpm for one minute, to obtain a composite powder coating composition of Comparative Example 1.

COMPARATIVE EXAMPLES 2 TO 15

Composite powder coating compositions of Comparative Examples 2 to 15 were produced in the same manner as Comparative Example 1, using the components shown in Tables 6 and 7 in the amounts indicated.

COMPARATIVE EXAMPLE 16

One hundred grams of "Evaclad #4800 White" and 10 g of "Evaclad #4800 Gray" were added to a high speed mixer (product of Fukae Industries Co., Ltd.; capacity: 2 l), and dry blended by agitation at an agitator speed of 600 rpm and a chopper speed of 4,000 rpm for one minute. The resulting blend was granulated by heating from 30° C. to 56° C. over a period of 30 minutes while being agitated under the same agitation conditions, followed by cooling to 20° C. over a period of 20 minutes, to obtain the composite powder coating composition of Comparative Example 16.

Tables 6 and 7 show the starting powder coating materials, and ΔL* and Δab of the coating films in Comparative Examples 1 to 16.

TABLE 6

| | | Comparative Example | | | | | | | |
|---|---|---|---|---|---|---|---|---|---|
| | | 1 | 2 | 3 | 4 | 5 | 6 | 7 | 8 |
| Starting powder coating material (No., color, base resin) | A1, White, Polyester resin | 100 | 100 | 100 | 100 | | | | 50 |
| | A2, Gray, Polyester resin | 10 | | | 5 | | | | |
| | A3, Yellow, Polyester resin | | 10 | | 5 | | | | |
| | A4, Transparent, Polyester resin | | | 10 | | | | | |
| | A5, White, Epoxy-polyester hybrid resin | | | | | 100 | | | 50 |
| | A6, Transparent, Epoxy-polyester hybrid resin | | | | | 10 | | | |
| | B1, White, Epoxy resin | | | | | | 100 | | |
| | B2, Transparent, Epoxy resin | | | | | | 10 | | |
| | C1, White, Acrylic resin | | | | | | | 100 | |
| | C2, Gray, Acrylic resin | | | | | | | 10 | |
| | C3, Transparent, Acrylic resin | | | | | | | | |
| ΔL* of coating film | | 25 | 11 | — | 11 25 | 25 | 25 | 25 | 25 |
| Δab of coating film | | 16< | 16< | 16< | 16< | 16< | 16< | 16< | 16< |

TABLE 7

| | | Comparative Example | | | | | | | |
|---|---|---|---|---|---|---|---|---|---|
| | | 9 | 10 | 11 | 12 | 13 | 14 | 15 | 16 |
| Starting powder coating material (No., color, base resin) | A1, White, Polyester resin | 50 | 40 | 80 | | | | | 100 |
| | A2, Gray, Polyester resin | | | | | | | | 10 |
| | A3, Yellow, Polyester resin | | | | | | | | |
| | A4, Transparent, Polyester resin | | | | | 50 | | | |
| | A5, White, Epoxy-polyester hybrid resin | | | | 80 | | 50 | | |
| | A6, Transparent, Epoxy-polyester hybrid resin | | | | | | | | |
| | B1, White, Epoxy resin | | 30 | | 80 | | | | |
| | B2, Transparent, Epoxy resin | | | | | | | | |
| | C1, White, Acrylic resin | 50 | 30 | | | | 50 | | |
| | C2, Gray, Acrylic resin | | | | | | | | |
| | C3, Transparent, Acrylic resin | | | 20 | 20 | 20 | 50 | | |
| ΔL* of coating film | | 0 | 0 | — | — | — | — | 0 | 25 |
| Δab of coating film | | 0 | 0 | 0 | 0 | 0 | 0 | 0 | 18< |

The blocking resistance, application workability, and film properties of the powder coating compositions of the Examples and Comparative Examples were tested by the following methods.

Blocking resistance: A test sample of powder coating composition was placed in a polyethylene bag and allowed to stand in a storage room at 20° C. for 1 month. The conditions of the powder coating composition was then inspected and evaluated according to the following criteria.

A: The powder coating composition did not change at all, indicating remarkably excellent blocking resistance; B: Slight aggregation of the powder coating composition occurred but was easily disintegratable with fingers, indicating excellent blocking resistance; C: Aggregation of the powder coating composition occurred, and it took time to disintegrate the aggregation with fingers, indicating poor blocking resistance; D: The powder coating composition was aggregated into a mass that was not disintegratable with fingers, indicating markedly poor blocking resistance.

Application workability: Using an electrostatic coating machine (tradename "PG-1", product of Matsuo Sangyo Co., Ltd.), a test sample of powder coating composition was electrostatically applied to a perpendicularly placed tin sheet (dimensions: 300 mm×300 mm) to a thickness of 50 μm (when cured), under coating conditions of an applied voltage of −70 KV, discharge amount of 150 g/min, substrate-gun tip distance of 200 mm, and coating time of 10 seconds, and the application workability was evaluated according to the following criteria.

A: Remarkably excellent application workability without discharge unevenness, or adhesion of the coating composition to the gun tip; B: Excellent application workability with only slight discharge unevenness, and only slight adhesion of the coating composition to the gun tip; C: Poor application workability with notable discharge unevenness and notable adhesion of the coating composition to the gun tip; D: Markedly poor application workability with highly notable discharge unevenness, and highly notable adhesion of the coating composition to the gun tip.

Film Property Test

A test sample of powder coating composition was electrostatically applied to a zinc phosphate-treated steel sheet to a thickness of 60 to 70 μm (when cured), and cured by heating at 180° C. for 30 minutes to obtain a coated sheet. The coated sheet was subjected to film property test to evaluate the appearance, flooding resistance, smoothness, water resistance, and fading resistance of the coating film. The recoverability/reusability of the powder coating composition was also tested. The test methods were as follows.

Appearance: The coating film surface of the coated sheet was observed visually, and evaluated according to the following criteria. A: Markedly excellent appearance without abnormalities such as seeding, gloss reduction, or the like; B: Excellent appearance with only few abnormalities such as seeding, gloss reduction, etc.; C: Poor appearance with abnormalities such as seeding, gloss reduction, etc.; D: Markedly poor appearance with many abnormalities such as seeding, gloss reduction, etc.

Flooding resistance: The coating film surface of the coated sheet was observed visually, and evaluated according to the following criteria. A: Remarkably excellent flooding resistance with uniform coating film color over the entire coated sheet; B: Excellent flooding resistance, i.e., slight flooding was observed at portions where the coating film was thin, but posed no problems for practical use; C: Poor flooding resistance with flooding over the entire coated sheet; D: Markedly poor flooding resistance with a great degree of flooding over the entire coated sheet.

Smoothness: The coating film surface of the coated sheet was observed visually, and evaluated according to the following criteria. A: Remarkably excellent smoothness without abnormalities such as unevenness, shrinkage, or the like; B: Excellent smoothness with only few abnormalities such as unevenness, shrinkage, etc.; C: Poor smoothness with some abnormalities such as unevenness, shrinkage, etc.; D: Markedly poor smoothness with many abnormalities such as unevenness, shrinkage, etc.

Water resistance: The coated sheet was immersed in 35° C. tap water for ten days, subjected to a crosscut adhesion test (50 squares measuring 2 mm×2 mm) using cellophane adhesive tape, and evaluated according to the following criteria. A: The peeled area accounted for 0% of the total area of the coating film, indicating remarkably excellent water resistance; B: The peeled area accounted for more than 0% and less than 5% of the total area of the coating film, indicating excellent water resistance; C: The peeled area accounted for not less than 5% but less than 10% of the total area of the coating film, indicating poor water resistance; D: The peeled area accounted for not less than 10% of the total area of the coating film, indicating notably poor water resistance.

Fading resistance: The coating film surface of the coated sheet was forcibly rubbed back and forth ten times with gauze impregnated with methyl ethyl ketone and pressed with fingers. The degree of fading was observed visually, and evaluated according to the following criteria. A: No fading was observed, indicating remarkably excellent fading resistance; B: Fading was observed but to a degree that does not pose practical problems, indicating excellent fading resistance; C: Fading was observed, indicating poor fading resistance; D: Fading was notable, indicating markedly poor fading resistance.

Recoverability/reusability: A recovery-application cycle consisting of recovering the portion of powder coating composition that was not deposited to the substrate during the electrostatic coating, and again applying the recovered portion by electrostatic powder coating, was carried out four times in total. The coating film of the coated sheet obtained by the last application operation was compared with the coating film of the coated sheet obtained by the first application operation, and evaluation was carried out according to the following criteria. A: No abnormalities such as flooding, color difference (difference from the first color; the same applies hereinafter), or the like were observed, indicating remarkably excellent recoverability/reusability; B: Some abnormalities such as flooding, color difference, etc., were observed but to a degree that does not pose practical problems, indicating excellent recoverability/reusability; C: Abnormalities such as flooding, color difference, etc., were observed, indicating poor recoverability/reusability; D: Abnormalities such as flooding, color difference, etc., were observed to a notable degree, indicating markedly poor recoverability/reusability.

Tables 8 to 11 show the results of testing the blocking resistance, application workability, and film properties of the powder coating compositions of the Examples and Comparative Examples.

TABLE 8

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Blocking resistance | A | A | A | A | A | A | A | A | A | A | A | A | A | A | A |
| Application workability | A | A | A | A | A | A | A | A | A | A | A | A | A | A | A |
| Appearance | A | A | A | A | A | A | A | A | A | A | A | A | A | A | A |
| Flooding resistance | A | A | A | A | A | A | A | A | — | — | — | A | A | A | |
| Smoothness | A | A | A | A | A | A | A | A | A | A | A | A | A | A | A |
| Water resistance | A | A | A | A | A | A | A | A | A | A | A | A | A | A | A |
| Fading resistance | A | A | A | A | A | A | A | A | A | — | — | — | A | A | A |
| Recoverability/reusability | A | A | A | A | A | A | A | A | A | A | A | A | A | A | A |

TABLE 9

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Blocking resistance | A | A | A | A | A | A | A | A | A | A | A | A | A | A | A |
| Application workability | A | A | A | A | A | A | A | A | A | A | A | A | A | A | A |
| Appearance | A | A | A | A | A | A | A | A | A | A | A | A | A | A | A |
| Flooding resistance | A | A | A | A | A | A | A | A | A | A | A | A | A | A | A |
| Smoothness | A | A | A | A | A | A | A | A | A | A | A | A | A | A | A |
| Water resistance | A | A | A | A | A | A | A | A | A | A | A | A | A | A | A |
| Fading resistance | A | A | A | A | A | A | A | A | A | A | A | A | A | A | A |
| Recoverability/reusability | A | A | A | A | A | A | A | A | A | A | A | A | A | A | A |

TABLE 10

| | Example | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Blocking resistance | A | A | A | A | A | A | A | A | A | A | A | A | A | A | A |
| Application workability | A | A | A | A | A | A | A | A | A | A | A | A | A | A | A |
| Appearance | A | A | A | A | A | A | A | A | A | A | A | A | A | A | A |
| Flooding resistance | A | A | A | A | A | A | A | A | A | A | A | A | A | A | A |
| Smoothness | A | — | — | — | — | — | — | — | — | — | — | — | — | — | — |
| Water resistance | A | A | A | A | A | A | A | A | A | A | A | A | A | A | A |
| Fading resistance | A | — | — | — | — | — | — | — | — | — | — | — | — | — | — |
| Recoverability/reusability | A | A | A | A | A | A | A | A | A | A | A | A | A | A | A |

TABLE 11

| | Comparative Example | | | | | | | | | | | | | | | |
| --- | --- | --- | --- | --- | --- | --- | --- | --- | --- | --- | --- | --- | --- | --- | --- | --- |
| | 1 | 2 | 3 | 4 | 5 | 6 | 7 | 8 | 9 | 10 | 11 | 12 | 13 | 14 | 15 | 16 |
| Blocking resistance | A | A | A | A | A | A | A | A | A | A | A | A | A | A | A | A |
| Application workability | C | C | C | C | C | C | C | C | C | C | C | C | C | C | C | D |
| Appearance | C | C | C | C | C | C | C | C | C | C | C | C | C | C | C | C |
| Flooding resistance | C | C | — | C | C | C | C | C | — | — | — | — | — | — | — | A |
| Smoothness | C | C | C | C | C | C | C | C | C | C | C | C | C | C | C | C |
| Water resistance | A | A | A | A | A | A | A | A | A | A | A | A | A | A | A | A |
| Fading resistance | A | A | — | A | A | A | A | A | — | — | — | — | — | — | — | A |
| Recoverability/reusability | C | C | C | C | C | C | C | C | C | C | C | C | C | C | C | A |

The invention claimed is:

1. A composite powder coating composition obtained by granulating, with a liquid binder, a plurality of starting powder coating materials that are different from each other in hue and/or kind of base resin, and drying the granules; the liquid binder being a solution or dispersion of at least one binder compound selected from the group consisting of N,N-di(β-hydroxyethyl)acetamide, bis(β-hydroxyethyl)adipoamide, bis(β-hydroxypropyl)adipoamide, bis[N,N-di(β-hydroxyethyl)]adipoamide, and bis[N,N-di(β-hydroxypropyl)]adipoamide, in a solvent that does not dissolve the starting powder coating materials.

2. A composite powder coating composition according to claim 1, wherein the proportion of the liquid binder is 0.1 to 20 parts by weight, on a solid basis, per 100 parts by weight of the starting powder coating materials.

3. A composite powder coating composition according to claim 1, wherein the starting powder coating materials have a mean particle diameter of not more than 50 μm.

4. A composite powder coating composition according to claim 3, wherein the starting powder coating materials have a mean particle diameter of 1 to 40 μm.

5. A composite powder coating composition according to claim 1, wherein the base resin of each starting powder coating material is at least one thermoplastic resin or thermosetting resin selected from the group consisting of polyester resins, vinyl resins, epoxy resins, fluororesins, and silicon resins.

6. A composite powder coating composition according to claim 1, wherein at least one of the plurality of starting powder coating materials is a thermosetting colored powder coating material.

7. A composite powder coating composition according to claim 1, wherein the starting powder coating materials have at least one hue selected from the group consisting of white, black, gray, blue, green, red, and yellow.

8. A composite powder coating composition according to claim 1, wherein the solvent of the liquid binder comprises water and/or a hydrophilic solvent as a main component.

9. A composite powder coating composition according to claim 8, wherein the hydrophilic solvent has a boiling point that is lower than the softening temperatures of the starting powder coating materials.

10. A composite powder coating composition according to claim 1, wherein the liquid binder has a binder compound solids content of 1 to 50 wt. %.

11. A method for forming a coating film, the method comprising applying to a metal substrate a composite powder coating composition according to claim 1 by electrostatic powder coating, and heating the applied composition to form a cured coating film.

12. A coated article comprising a metal substrate and a coating film formed on the substrate by a method according to claim 11.

13. A process for producing a composite powder coating composition, the process comprising the steps of:
 (1) dry blending a plurality of starting powder coating materials that are different from each other in hue and/or kind of base resin;
 (2) granulating the resulting blend by adding a liquid binder obtained by dissolving or dispersing, in a solvent that does not dissolve the starting powder coating materials, at least one binder compound selected from the group consisting of N,N-di(β-hydroxyethyl)acetamide, bis(β-hydroxyethyl)adipoamide, bis(β-hydroxypropyl)adipoamide, bis[N,N-di(β-hydroxyethyl)]adipoamide, and bis[N,N-di(β-hydroxypropyl)]adipoamide; and
 (3) drying the granules.

14. A method for color matching a composite powder coating composition, the method comprising the steps of:
 (1) dry blending a plurality of starting colored powder coating materials having different hues, for color matching;
 (2) granulating the resulting blend by adding a liquid binder obtained by dissolving or dispersing, in a solvent that does not dissolve the starting powder coating materials, at least one binder compound selected from the group consisting of N,N-di(β-hydroxyethyl)acetamide, bis(β-hydroxyethyl)adipoamide, bis(β-hydroxypropyl)adipoamide, bis[N,N-di(β-hydroxyethyl)]adipoamide, and bis[N,N-di(β-hydroxypropyl)]adipoamide; and
 (3) drying the granules.

15. A color matching method according to claim 14, wherein the proportion of the liquid binder is 0.1 to 20 parts by weight, on a solid basis, per 100 parts by weight of the starting colored powder coating materials.

16. A color matching method according to claim 14, wherein the starting colored powder coating materials have a mean particle diameter of not more than 50 μm.

17. A color matching method according to claim 16, wherein the starting colored powder coating materials have a mean particle diameter of 1 to 40 μm.

18. A color matching method according to claim 14, wherein the base resin of each starting colored powder coating material is at least one thermoplastic resin or thermosetting resin selected from the group consisting of polyester resins, vinyl resins, epoxy resins, fluororesins, and silicon resins.

19. A color matching method according to claim 14, wherein at least one of the plurality of starting colored powder coating materials is a thermosetting colored powder coating material.

20. A color matching method according to claim 14, wherein the starting colored powder coating materials have at least one hue selected from the group consisting of white, black, gray, blue, green, red, and yellow.

21. A color matching method according to claim 14, wherein the solvent of the liquid binder comprises water and/or a hydrophilic solvent as a main component.

22. A color matching method according to claim 21, wherein the hydrophilic solvent has a boiling point that is lower than the softening temperatures of the starting colored powder coating materials.

23. A color matching method according to claim 14, wherein the liquid binder has a solids content of 1 to 50 wt. %.

* * * * *